(12) United States Patent
Aradhyula et al.

(10) Patent No.: US 11,327,459 B2
(45) Date of Patent: May 10, 2022

(54) MULTI-DEVICE CONNECTIONS FOR INPUT/OUTPUT (I/O) TERMINALS

(71) Applicant: Honeywell International Inc., Morris Plains, NJ (US)

(72) Inventors: Vamsee Krishna Aradhyula, Hyderabad (IN); Nagaraja Sundaresh, Hyderabad (IN); Shripad Kumar Pande, Hyderabad (IN); Ram Mohan Anugu, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 86 days.

(21) Appl. No.: 16/288,557

(22) Filed: Feb. 28, 2019

(65) Prior Publication Data
US 2020/0278652 A1 Sep. 3, 2020

(51) Int. Cl.
| | | |
|---|---|---|
| *H01H 9/54* | (2006.01) | |
| *H01H 33/59* | (2006.01) | |
| *H01H 47/00* | (2006.01) | |
| *H01H 85/46* | (2006.01) | |
| *H01H 3/26* | (2006.01) | |
| *H01H 3/28* | (2006.01) | |
| *G05B 19/05* | (2006.01) | |
| *G01D 21/00* | (2006.01) | |
| *G05B 19/042* | (2006.01) | |

(52) U.S. Cl.
CPC ........... *G05B 19/054* (2013.01); *G01D 21/00* (2013.01); *G05B 19/0423* (2013.01); *G05B 2219/1157* (2013.01)

(58) Field of Classification Search
CPC .............. G05B 19/054; G05B 19/0423; G05B 2219/1157; G01D 21/00
USPC ....................................................... 307/140
See application file for complete search history.

(56) References Cited

U.S. PATENT DOCUMENTS

| | | | |
|---|---|---|---|
| 8,072,098 B2 | 12/2011 | Elias et al. | |
| 8,392,626 B2 | 3/2013 | Wormmeester et al. | |
| 8,656,065 B1 | 2/2014 | Gerhart et al. | |
| 8,922,060 B2* | 12/2014 | Koshin | H02J 7/34 |
| | | | 307/66 |
| 2008/0126665 A1 | 5/2008 | Burr et al. | |

(Continued)

OTHER PUBLICATIONS

"General Specifications—Models ANB10S, ANB10D—ESB Bus Node Units (for FIO)", Yokogawa Electric Corp., 2011, 4 pages.

(Continued)

*Primary Examiner* — Richard Tan
(74) *Attorney, Agent, or Firm* — Ortiz & Lopez, PLLC; Kermit D. Lopez; Luis M. Ortiz (57) ABSTRACT

An apparatus includes multiple circuit paths configured to generate multiple electrical signals to be used to communicate with multiple devices. Each of the circuit paths is configured to use electrical energy from a different one of multiple independent power supplies. The apparatus also includes an I/O terminal configured to be coupled to a common electrical conductor that is coupled to the multiple devices. The I/O terminal is configured to pass the electrical signals to the common electrical conductor. The apparatus is configured to use each of the electrical signals to one of: receive input data from one of the multiple devices or provide output data to one of the multiple devices.

17 Claims, 7 Drawing Sheets

(56) References Cited

U.S. PATENT DOCUMENTS

2012/0091814 A1 4/2012 Koshin et al.
2015/0278144 A1 10/2015 McLaughlin et al.

OTHER PUBLICATIONS

"Technical Information—Integrated Production Control System—Centum VP", Yokogawa Electric Corp., Sep. 2011, 44 pages.
"Technical Data—1715 Redundant I/O System Specifications", Rockwell Automation, Jan. 2017, 22 pages.
"Leveraging Universal Channel Technology to Drive Automation Project Efficiencies", Honeywell Process Solutions, Sep. 2014, 10 pages.
"Experion Universal Process I/O", Honeywell Process Solutions, Nov. 2012, 2 pages.
Examination Report for corresponding Indian Application No. 202014006821.

* cited by examiner

MULTI-DEVICE CONNECTIONS FOR INPUT/OUTPUT (I/O) TERMINALS

TECHNICAL FIELD

This disclosure generally relates to input/output (I/O) systems. More specifically, this disclosure relates to multi-device connections for I/O terminals.

BACKGROUND

Industrial process control and automation systems are often used to automate large and complex industrial processes. These types of systems routinely include various components including sensors, actuators, and controllers. Some of the controllers can receive measurements from the sensors, possibly through connected input/output (I/O) sub-systems, and generate control signals for the actuators. Existing process control and automation systems typically have hardware components participating in control and I/O functions that are installed in control rooms and in the field. These hardware components are often used to gather I/O information from the field, transmit that I/O information to the control rooms, perform various control functions, and transmit I/O information back to the field.

SUMMARY

This disclosure provides multi-device connections for input/output (I/O) terminals.

In a first embodiment, a method includes generating multiple electrical signals to be used to communicate with multiple devices. Each of the multiple electrical signals is generated using electrical energy from a different one of multiple independent power supplies. The method also includes transmitting the multiple electrical signals through an I/O terminal coupled to a common electrical conductor, where the common electrical conductor is also coupled to the multiple devices. The method further incudes, for each of the electrical signals, using the electrical signal to one of: receive input data from one of the multiple devices or provide output data to one of the multiple devices.

In a second embodiment, an apparatus includes multiple circuit paths configured to generate multiple electrical signals to be used to communicate with multiple devices. Each of the circuit paths is configured to use electrical energy from a different one of multiple independent power supplies. The apparatus also includes an I/O terminal configured to be coupled to a common electrical conductor that is coupled to the multiple devices. The I/O terminal is configured to pass the electrical signals to the common electrical conductor. The apparatus is configured to use each of the electrical signals to one of: receive input data from one of the multiple devices or provide output data to one of the multiple devices.

In a third embodiment, a system includes an I/O module having an I/O terminal, multiple field devices, and an electrical conductor coupled to the I/O terminal and the field devices. The I/O module further includes multiple circuit paths configured to generate multiple electrical signals to be used to communicate with the multiple devices. Each of the circuit paths is configured to use electrical energy from a different one of multiple independent power supplies. The I/O terminal is configured to pass the electrical signals to the electrical conductor. The I/O module is configured to use each of the electrical signals to one of: receive input data from one of the multiple devices or provide output data to one of the multiple devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 9, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems typically have hardware components participating in various control and input/output (I/O) functions. In many cases, an industrial process controller communicates with one or more field devices (such as one or more sensors or actuators) through one or more I/O modules. The I/O modules typically include circuitry used to generate electrical signals for communicating with the field devices over various I/O channels. The I/O modules also typically include physical connections (such as screw terminals) used to connect the I/O modules to electrical conductors coupling the I/O modules to the field devices.

In some cases, I/O modules support the use of universal or reconfigurable I/O channels, each of which can be reconfigured into different types of I/O channels. For example, a universal or reconfigurable I/O channel could be configurable into an analog input channel, a digital input channel, an analog output channel, or a digital output channel. While this functionality is quite useful, there can be shortcomings. For example, each universal or reconfigurable I/O channel typically includes circuit components supporting both analog and digital I/O, but only the analog I/O components or only the digital I/O components are used at any given time. This results in underutilization of the hardware in the I/O modules since circuit components supporting digital I/O are not used during analog I/O and circuit components supporting analog I/O are not used during digital I/O. This leads to higher overall system costs and larger equipment spaces. Moreover, it is often desirable to increase the number of I/O channels provided by an I/O module, but various factors can limit the ability to increase the number of I/O channels. For instance, limited space on a printed circuit board or other structure can restrict the number of I/O channels in an I/O module, and managing thermal issues can become very complex in I/O modules having higher channel densities.

This disclosure describes various approaches for driving multiple loads using a single connection of an I/O module or other device. For example, multiple field devices (like multiple sensors and/or actuators) can be connected to a single electrical conductor that is coupled to a single I/O terminal of an I/O module. The I/O module generates electrical signals that are sent through the I/O terminal and over the common electrical conductor to the different field devices. These approaches therefore allow a single connection to a physical electrical conductor to be used to drive multiple I/O channels. The driving of multiple I/O channels can occur simultaneously, and the I/O channels can be driven such that they do not significantly interfere with one another. In some embodiments, multiple I/O channels can be driven using the components associated with a single universal or reconfigurable I/O channel. However, this disclosure is not limited to use with universal or reconfigurable I/O channels.

In this way, multiple I/O channels can be supported over a single electrical conductor. This can be replicated any suitable number of times in order to increase the channel density of an I/O module or other device. Moreover, this increase in channel density can be obtained without requiring the addition of more universal, reconfigurable, or other I/O channel circuitry, which allows more I/O channels to be used in a limited space and helps with thermal management. In addition, these approaches help to increase I/O channel densities in a very cost-effective manner.

Figure 1:
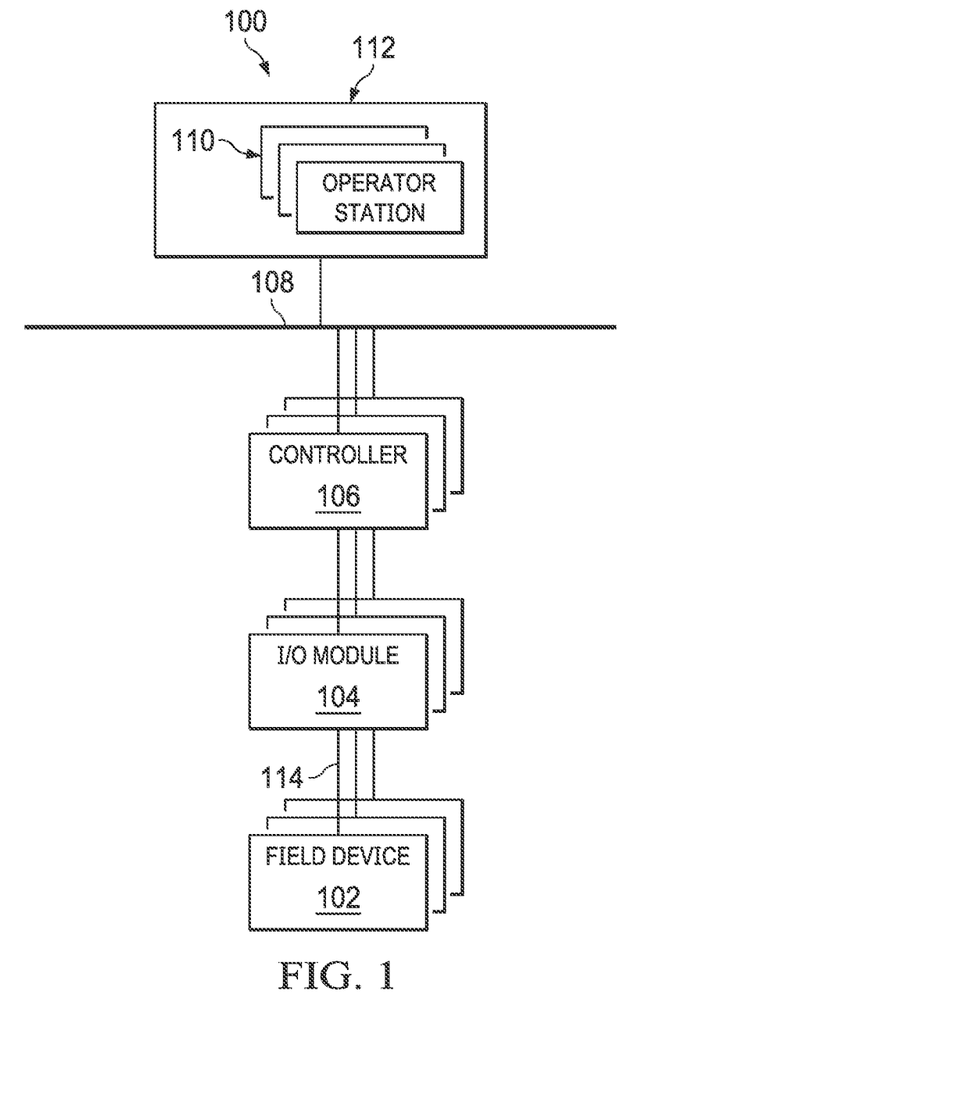
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In the example shown in FIG. 1, the system 100 includes multiple field devices 102. Each field device 102 generally represents a device that provides input data to or receives output data from at least one other component of the system 100. For example, the field devices 102 may include one or more sensors and one or more actuators. The sensors and actuators represent components in a process system that may perform any of a wide variety of functions. For example, the sensors could measure a wide variety of characteristics in the process system, such as temperature, pressure, or flow rate. Also, the actuators could alter a wide variety of characteristics in the process system. Each of the sensors includes any suitable structure for measuring one or more characteristics in a process system. Each of the actuators includes any suitable structure for operating on or affecting one or more conditions in a process system.

One or more I/O modules 104 are communicatively coupled to the field devices 102. The I/O modules 104 facilitate interactions with sensors, actuators, or other field devices 102. For example, an I/O module 104 could be used to receive one or more analog inputs (AIs), digital inputs (DIs), or other inputs from one or more field devices 102. An I/O module 104 could also be used to provide one or more analog outputs (AOs), digital outputs (DOs), or other outputs to one or more field devices 102. Each I/O module 104 includes any suitable structure(s) for receiving one or more input signals from or providing one or more output signals to one or more field devices 102.

In some embodiments, at least some of the I/O channels provided by the I/O modules 104 are sourcing-type I/O channels. A sourcing-type I/O channel generally refers to an I/O channel in which electrical current is sourced by an I/O module 104 (or other device) to a field device 102 (or other device) and used for input of data from or output of data to the field device 102. When used with an analog or digital input channel, an input current is provided by the I/O module 104 to the field device 102, and the field device 102 can alter its resistance or other characteristic(s) to vary the current drawn from the I/O module 104. In this case, the current can be used to represent analog values or digital states being sent from the field device 102. When used with an analog or digital output channel, an output current is driven by the I/O module 104 to the field device 102, and the output current can be varied by the I/O module 104. In that case, the current can be used to represent analog values or digital states being sent to the field device 102. Also, in some embodiments, the I/O modules 104 may be arranged in redundant pairs, where data can pass through both I/O modules to reach one or more destinations.

The system 100 also includes one or more controllers 106. The controllers 106 can be used in the system 100 to perform various functions in order to control one or more industrial processes. For example, the controllers 106 may use measurements from one or more sensors to control the operation of one or more actuators. The controllers 106 could interact with the sensors, actuators, and other field devices 102 via the I/O modules 104. In some embodiments, the controllers 106 may be arranged in redundant pairs, where one controller in each pair operates in a primary mode and the other controller in that pair operates in a redundant or backup mode (and is ready to take over operation if the primary controller fails).

Each controller 106 includes any suitable structure for controlling one or more aspects of an industrial process. At least some of the controllers 106 could, for example, represent programmable logic controllers (PLCs), proportional-integral-derivative (PID) controllers, or multivariable controllers such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system. Note that while shown as separate components here, a controller 106 can often be integrated with one or more I/O modules 104 and other components (like at least one power supply), such as within a single row of an equipment rack. Multiple such instances of integrated components can be placed in the same row of an equipment rack, in different rows of the equipment rack, or in different equipment racks. Of course, components can be integrated and positioned in any other suitable manner.

One or more networks 108 couple the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various I/O modules 104, controllers 106, and operator stations 110 in FIG. 1 may represent or include computing or data processing devices. For example, each of the I/O modules, controllers, and operator stations could include one or more processing devices, such as one or more microprocessors, microcontrollers, digital signal processors (DSPs), field programmable gate arrays (FPGAs), application specific integrated circuits (ASICs), or discrete circuitry. Each of the I/O modules, controllers, and operator stations could also include one or more memories storing instructions and data used, generated, or collected by the processing device(s) or the larger device, such as a random access memory, read only memory, Flash memory, optical disc, hard drive, or any other suitable volatile or non-volatile storage device(s). Each of the I/O modules, controllers, and operator stations could further include at least one interface, such as one or more field device protocol interfaces, Ethernet interfaces, or wireless transceivers, that enables communications with other devices or systems.

In process control and automation systems such as the system 100, I/O channels are used to connect the controllers 106 and the field devices 102. In general, the I/O modules 104 or other devices can support I/O channels of various types, including AIs, DIs, AOs, or DOs. Different I/O channel types are characterized by different inputs, outputs, voltages, currents, and configurations. A universal I/O (UIO) channel is a specialized I/O channel that is reconfigurable to operate as any of multiple I/O channel types. Example types of UIO circuits are shown in U.S. Pat. Nos. 8,072,098; 8,392,626; 8,656,065; and U.S. Patent Publication No. 2015/0278144 (all of which are hereby incorporated by reference in their entirety). UIO circuits that support Universal Channel Technology available from HONEYWELL INTERNATIONAL INC. are also suitable for use.

As described in more detail below, at least one component in the system 100 or other system supports the ability to communicate with multiple devices through a single I/O terminal. For example, an I/O module 104 in the system 100 may be configured to communicate with multiple field devices 102 through a single I/O terminal of the I/O module 104. The I/O terminal can be connected to an electrical conductor 114, and components of the I/O module 104 can be used to generate electrical signals that are transmitted through the I/O terminal and over the electrical conductor 114 to the multiple field devices 102. This can be done for a single I/O terminal of the I/O module 104 or for multiple I/O terminals of the I/O module 104. As explained below, the I/O module 104 is designed to enable the simultaneous transmission of multiple electrical signals to multiple field devices 102 over a common electrical conductor 114 without interference (or at least any significant interference that prevents proper operation of the field devices 102). Note, however, that this functionality can be incorporated into any suitable device or devices and is not limited to use with I/O modules.

In some embodiments, the components of the I/O module 104 used to provide this functionality include components of universal or reconfigurable I/O channels. For example, in particular implementations, an I/O module 104 may include circuit components used to drive a digital signal and circuit components used to drive an analog signal (such as a 4-20 mA current signal). Conventionally, only one of these circuits may be used at a given time, while the other circuit remains idle. However, in accordance with this disclosure, both sets of circuit components can be used simultaneously to support communications and data exchanges with multiple field devices 102 or other devices.

Additional details regarding this functionality are provided below. Note that the discussion below may often assume that universal or reconfigurable I/O channel components are being used to support communications with specific types of devices (such as an analog input device and a digital output device). However, this disclosure is not limited to use with these specific I/O channel components or these specific devices. In general, this functionality can be used with any suitable I/O channel components that are configured to provide electrical signals transported over the same electrical conductor to any suitable devices.

Each electrical conductor 114 represents any suitable conductive structure configured to transport multiple electrical signals over the same conductive medium. Each electrical conductor 114 can be formed from any suitable materials, such as a conductive medium surrounded by a non-conductive sheathe or other electrical insulator. For example, each electrical conductor 114 could represent a single conductive wire.

Although FIG. 1 illustrates one example of an industrial process control and automation system 100, various changes may be made to FIG. 1. For example, the system 100 could include any number of field devices, I/O modules, controllers, networks, operator stations, and other components in any suitable arrangement. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which multi-device connections can be supported over I/O terminals. This functionality can be used in any other suitable system, and the system need not be related to industrial process control and automation.

Figure 2:
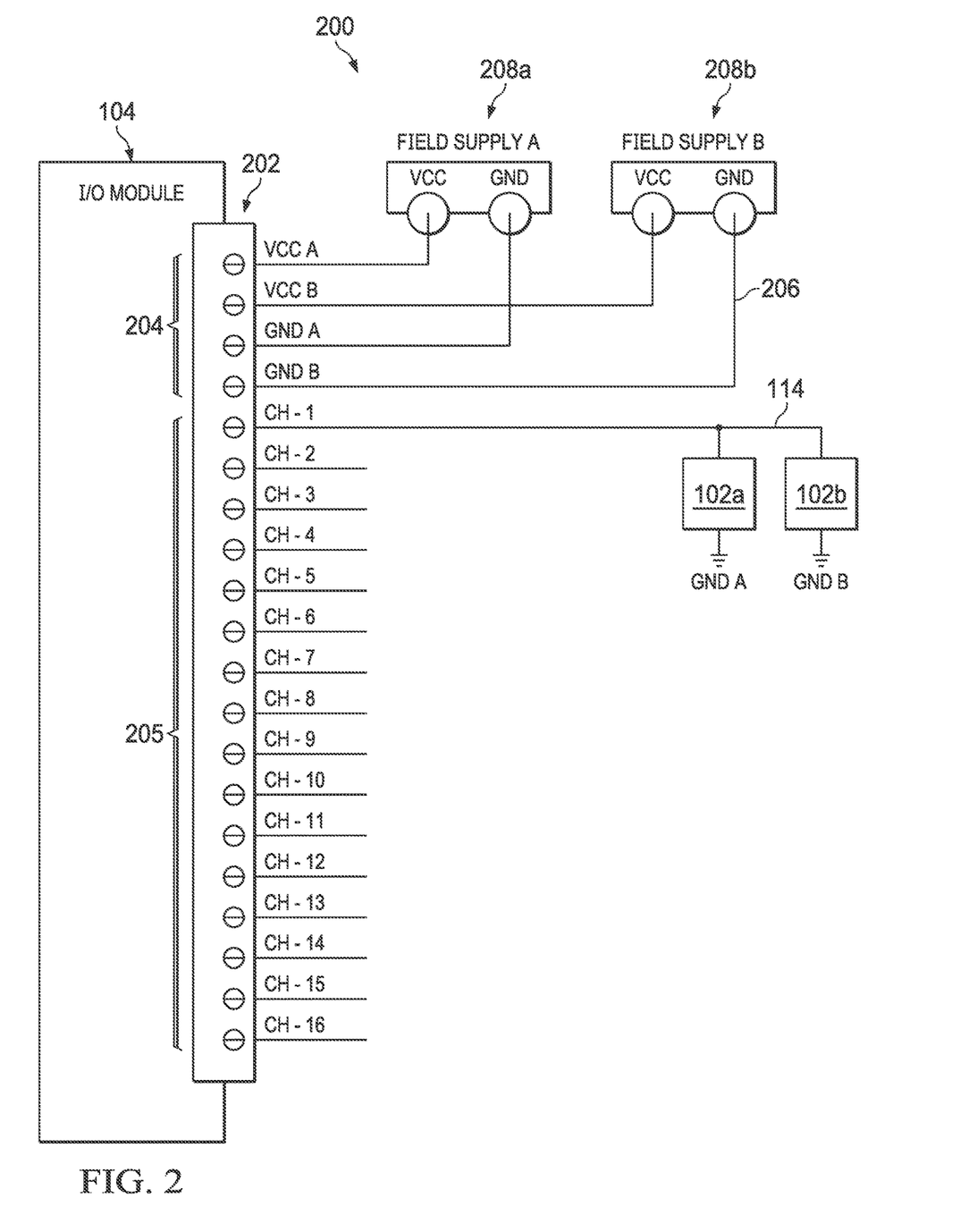
FIG. 2 illustrates an example use of a multi-device connection for an input/output (I/O) terminal according to this disclosure.

FIG. 2 illustrates an example use 200 of a multi-device connection for an I/O terminal according to this disclosure. For ease of explanation, the multi-device connection shown in FIG. 2 is described as being used by an I/O module 104 with multiple field devices 102 in the system 100 shown in FIG. 1. However, the multi-device connection can be used with any other suitable devices and in any other suitable systems, regardless of whether or not those devices or systems are used for industrial process control and automation.

As shown in FIG. 2, the I/O module 104 includes one or more terminal blocks 202, and each terminal block 202 includes various electrical terminals. In this example, the terminal block 202 includes power terminals 204 and I/O terminals 205. The power terminals 204 are used to electrically couple the I/O module 104 to multiple sources of electrical energy via electrical conductors 206. The I/O terminals 205 are used to electrically couple devices (such as field devices 102) to the I/O module 104 via electrical conductors 114. Each terminal 204 and 205 represents any suitable structure configured to be coupled to an electrical conductor. For instance, each terminal 204 and 205 could represent a screw terminal. In this example, the terminal block 202 includes four power terminals 204 and sixteen I/O terminals 205. However, the I/O module 104 could include any suitable number of terminal blocks 202, and each terminal block 202 could include any suitable number of power terminals 204 and I/O terminals 205.

Multiple power supplies 208a-208b are coupled to the I/O module 104. The power supplies 208a-208b are configured to provide electrical energy to the I/O module 104 for use in generating electrical signals used to communicate with devices coupled to the I/O module 104. As shown in FIG. 2, each of the power supplies 208a-208b is coupled to two power terminals 204 of the I/O module 104. For each power supply 208a-208b, one power terminal 204 is used as a supply voltage (VCC) terminal, and another power terminal 204 is used as a ground (Gnd) terminal. Each power supply 208a-208b includes any suitable source of electrical power, such as one or more batteries, solar cells, fuel cells, or power converters. In particular embodiments, each power supply 208a-208b could be used to provide a 24 VDC input to the I/O module 104, although other inputs could be used.

As described in more detail below, the power supplies 208a-208b represent independent sources of electrical energy, which means the electrical energy provided by each power supply 208a-208b is independent of the electrical energy provided by the other power supply or supplies 208a-208b. To achieve this independence, the power supplies 208a-208b can be implemented in various ways. For example, the power supplies 208a-208b could represent completely isolated power supplies such that each power supply provides electrical energy independent of the other power supplies. This could be accomplished using different batteries, solar cells, fuel cells, or other isolated power sources. The power supplies 208a-208b could also represent power converters (such as AC/DC or DC/DC converters) or other structures that receive input power from a common source (such as a distribution grid, battery, or other power source) and separately convert the input power. Note that while two power supplies 208a-208b are shown in FIG. 2, the I/O module 104 could be coupled to more than two power supplies 208a-208b.

In FIG. 2, one I/O terminal 205 of the I/O module 104 is coupled to a single electrical conductor 114, which is also electrically connected to two field devices 102a-102b. Each field device 102a-102b can be configured to communicate over any suitable I/O channel, such as an AI, AO, DI, or DO channel. As described in more detail below, the power supplies 208a-208b coupled to the I/O module 104 can be used to separately drive electrical signals transmitted over the electrical conductor 114 to the field devices 102a-102b. This allows multiple input and/or output signals to be transmitted over the same electrical conductor 114 simultaneously. For example, in the context of a universal or reconfigurable I/O channel, such I/O channels typically include analog and digital circuit components as noted above, but only one is typically used at any given time. Since multiple power supplies 208a-208b can be coupled to the I/O module 104 here, the power supplies 208a-208b can be separately used by the analog and digital circuit components simultaneously, allowing two I/O channels to be used at the same time to communicate with two field devices 102a-102b. Note, however, that there is no requirement that devices coupled to the same electrical conductor 114 be limited to one analog device and one digital device or to one input device and one output device.

Although FIG. 2 illustrates one example of a use 200 of a multi-device connection for an I/O terminal 205, various changes may be made to FIG. 2. For example, while FIG. 2 shows multiple devices coupled to a single I/O terminal 205 of the I/O module 104, the same or similar arrangement of a single electrical conductor 114 coupled to multiple devices can be replicated and used with any number of the I/O terminals 205. Also, while FIG. 2 shows two power supplies 208a-208b and two field devices 102a-102b coupled to a single electrical conductor 114, there could conceivably be up to n electrical currents flowing on the same electrical conductor 114 to n devices without significant interference (assuming there are n independent power supplies available for use).

Figure 3:
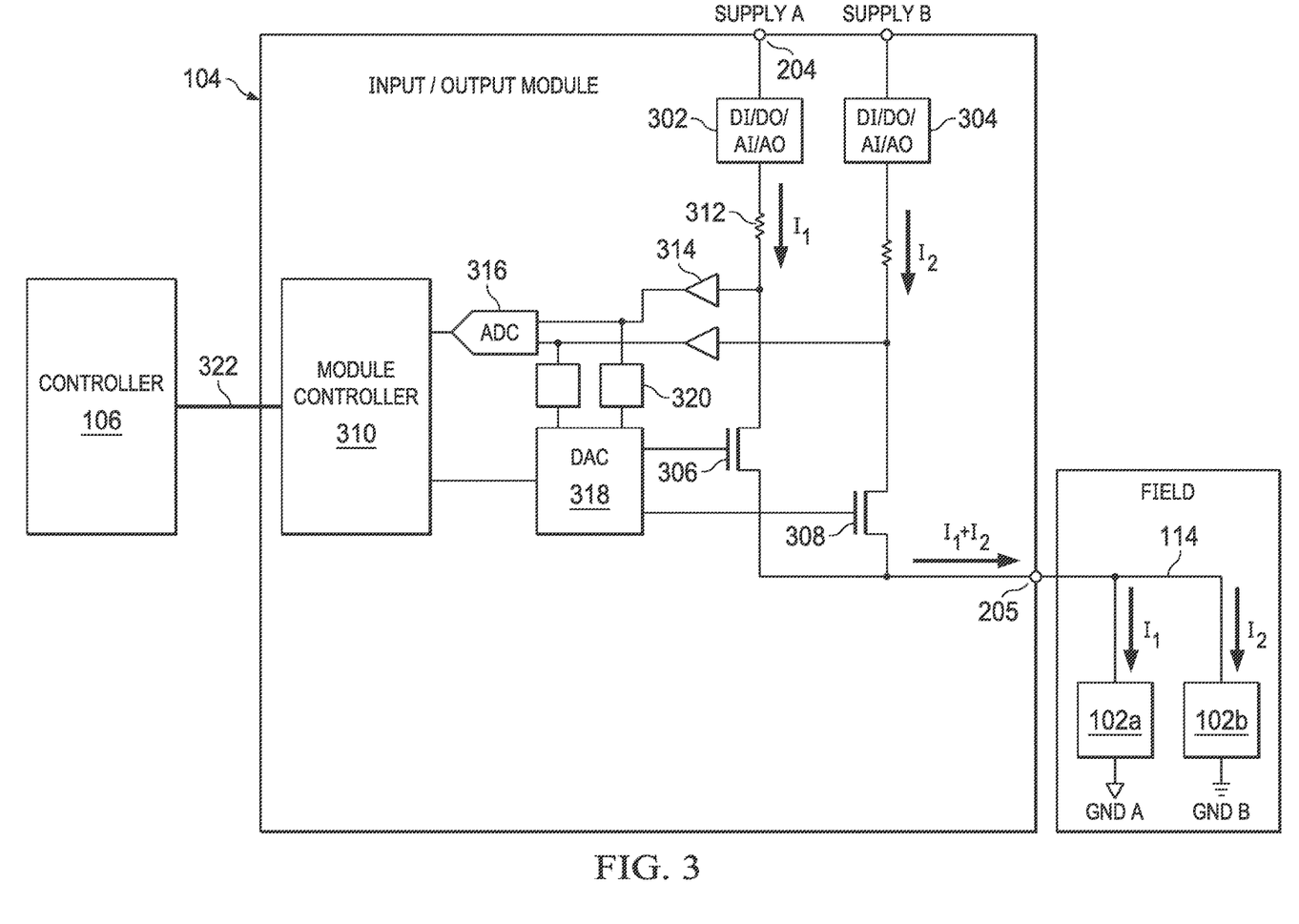
FIG. 3 illustrates an example I/O module supporting multi-device connections on I/O terminals according to this disclosure.

FIG. 3 illustrates an example I/O module 104 supporting multi-device connections on I/O terminals according to this disclosure. For ease of explanation, the I/O module 104 in FIG. 3 is described as being used in the arrangement shown in FIG. 2 within the system 100 shown in FIG. 1. However, the I/O module 104 can be used in any other suitable arrangements or systems, whether or not it is used for industrial process control and automation.

As shown in FIG. 3, the I/O module 104 here includes first I/O circuitry 302 and second I/O circuitry 304. The first I/O circuitry 302 generally includes circuitry used to generate an electrical current $I_1$ for a first field device 102a. The electrical current $I_1$ could be used to support any suitable I/O channel with the first field device 102a, such as an AI, AO, DI, or DO channel. Similarly, the second I/O circuitry 304 generally includes circuitry used to generate an electrical current $I_2$ for a second field device 102b. The electrical current $I_2$ could be used to support any suitable I/O channel with the second field device 102b, such as an AI, AO, DI, or DO channel. Each of the I/O circuitry 302 and the I/O circuitry 304 can include any suitable components used to provide an electrical signal. In some embodiments, the I/O circuitry 302 and the I/O circuitry 304 can each be configured to generate an electrical current for a specific type of I/O channel. In other embodiments, the I/O circuitry 302 and the I/O circuitry 304 can each be reconfigurable to generate an electrical current for different types of I/O channels, such as by supporting various universal or reconfigurable I/O channels as described above.

The I/O circuitry 302 and the I/O circuitry 304 are coupled in series with switches 306 and 308, respectively. Each switch 306 and 308 is configured to be selectively activated (made conductive) and deactivated (made non-conductive) in order to control a flow of electrical current through the associated circuitry 302 and 304. Each switch 306 and 308 includes any suitable structure configured to selectively allow and block an electrical current flow, such as a PNP-type field effect transistor (FET), bipolar junction transistor (BJT), or other transistor.

A module controller 310 generally operates to control various operations of the I/O module 104. For example, the module controller 310 can be coupled to control gates of the switches 306 and 308 in order to control the activation and deactivation of the switches 306 and 308. The module controller 310 can therefore separately provide drive signals to the control gates of the switches 306 and 308 in order to control whether the electrical currents $I_1$ and $I_2$ are generated. The module controller 310 could also use current measurements to identify input data being received from at least one field device 102 and/or to confirm that output data was transmitted to at least one field device 102. The module controller 310 includes any suitable structure for controlling the generation of electrical signals in a device. For instance, the module controller 310 may include one or more microprocessors, microcontrollers, DSPs, FPGAs, ASICs, or discrete circuitry.

In this example, the I/O circuitry 302 and the I/O circuitry 304 are each coupled in series with a sense resistor 312. Each sense resistor 312 is configured to generate a voltage drop that can be used to measure the current generated by the associated I/O circuitry 302 or 304. Each sense resistor 312 includes any suitable resistive structure having any suitable resistance. Each sense resistor 312 typically has a suitably small resistance that allows the current flowing through the resistor 312 to be accurately measured. Amplifiers 314 are configured to amplify the voltages generated by the sense resistors 312. Each amplifier 314 includes any suitable structure configured to amplify an electrical signal, such as an instrumentation amplifier. Outputs from the amplifiers 314 are provided to at least one analog-to-digital converter (ADC) 316, which converts the amplified analog electrical signals into digital values. Each ADC 316 includes any suitable structure configured to convert analog signals into digital values. Outputs from the ADC 316 are provided to the module controller 310, which (among other things) can use the outputs from the ADC 316 as measurements of electrical currents being used to provide AI or DI input data or as readback measurements of electrical currents being used to provide AO or DO output data.

The module controller 310 can also generate digital signals that are provided to at least one digital-to-analog converter (DAC) 318, which converts the digital signals into analog signals for driving the gates of the switches 306 and 308. Each DAC 318 includes any suitable structure configured to convert digital values into analog signals. The outputs from the amplifiers 314 can also be provided to comparators 320, which compare the amplified electrical signals to threshold values. Outputs from the comparators 320 can be provided to the DAC 318 and used to control the driving of the gates of the switches 306 and 308. This may allow, for example, the comparators 320 to be used to detect excessive voltages or currents being generated by the I/O circuitry 302 or 304 and to shut down the driving of the associated switch 306 or 308. Each comparator 320 includes any suitable structure configured to compare an electrical signal to a reference signal.

As can be seen in FIG. 3, the I/O module 104 here has the ability to use electrical energy from multiple independent power supplies 208a-208b (received via power terminals 204) and multiple circuit paths to drive different electrical signals to multiple devices 102a-102b (over the I/O terminal 205). These electrical signals can be transported over the same electrical conductor 114 without significant (or any) interference. This can help to greatly increase the channel density of the I/O module 104 in a very compact and cost-effective manner. It should be noted here that the components shown in FIG. 3 (except for possibly the module controller 310 and/or the power terminals 204) can be replicated any suitable number of times to support the driving of electrical signals to multiple devices over any suitable number of I/O terminals 205. It should also be noted here that additional circuitry can be provided here to enable the driving of more than two electrical signals to more than two devices through the same I/O terminal 205 (and this again can be replicated for any suitable number of I/O terminals 205).

The module controller 310 here is communicatively coupled to at least one controller 106 or other device(s) via at least one cable 322. This may allow, for example, the module controller 310 to provide analog values or digital states used for AI or DI channels to the controller(s) 106 for use. The analog values or digital states here can be identified by the module controller 310 based on measurements across the sense resistors 312 as amplified by the amplifiers 314 and digitized by the ADC 316. This may also allow the module controller 310 to receive analog values or digital states used for AO or DO channels from the controller(s) 106 and to drive the switches 306 and 308 so that the appropriate currents are generated. Readback values associated with the AO or DO currents can also be identified by the module controller 310 based on measurements across the sense resistors 312 as amplified by the amplifiers 314 and digitized by the ADC 316 (and those readback values may optionally be provided to the controller 106). Each cable 322 includes any suitable transmission medium enabling communication between the I/O module 104 and at least one controller 106 or other device(s), such as a single-conductor or multi-conductor cable or a wireless network.

Although FIG. 3 illustrates one example of an I/O module 104 supporting multi-device connections on I/O terminals 205, various changes may be made to FIG. 3. For example, any suitable field devices could be coupled to the same electrical conductor 114 for communication through a single I/O terminal 205. Also, more than two field devices could be coupled to the same electrical conductor 114 for communication through a single I/O terminal 205.

Figure 4:
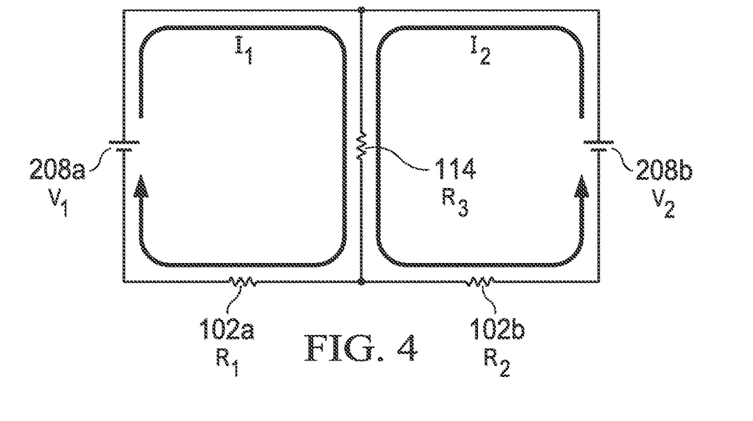
FIG. 4 illustrates an example equivalent circuit for a multi-device connection on an I/O terminal according to this disclosure.

FIG. 4 illustrates an example equivalent circuit 400 for a multi-device connection on an I/O terminal 205 according to this disclosure. For ease of explanation, the equivalent circuit 400 in FIG. 4 is described as representing the I/O module 104 shown in FIGS. 2 and 3 within the system 100 shown in FIG. 1. However, the same or similar equivalent circuit 400 could be used to represent any other suitable device in any other suitable system, whether or not the device or system is used for industrial process control and automation.

As shown in FIG. 4, the equivalent circuit 400 represents the power supplies 208a-208b as voltage sources configured to provide voltages $V_1$ and $V_2$, respectively. The equivalent circuit 400 also represents the field devices 102a-102b as loads having resistances $R_1$ and $R_2$, respectively. A third resistance $R_3$ represents the resistance of the electrical conductor 114. Impedances of controls (such as the switches 306 and 308 and the sense resistors 312) are omitted here for clarity. The electrical current $I_1$ here flows through the power supply 208a, the electrical conductor 114, and the field device 102a. The electrical current $I_2$ here flows through the power supply 208b, the electrical conductor 114, and the field device 102b.

According to the "superposition" theorem, the current $I_1$ can be determined as follows:

$$I_1 = I_{11} + I_{12} \quad (1)$$

where:

$$I_{11} = V_1/(R_1 + R_2 \| R_3) \quad (2)$$

$$I_{12} = -V_d/R_1 \quad (3)$$

$$V_d = (R_1 \| R_3 V_2)/(R_2 + R_1 \| R_3) \quad (4)$$

Here, the notation "$R_a \| R_b$" refers to the overall resistance created using parallel resistances $R_a$ and $R_b$.

Assume that the resistance $R_3$ in FIG. 4 is equal to zero. Also assume that both electrical currents $I_1$ and $I_2$ are being driven by the I/O module 104 simultaneously. From Equation (4) above, $V_d$ equals zero when $R_3$ equals zero. From Equation (3) above, $I_{12}$ equals zero when $V_d$ equals zero. Thus, when $R_3$ equals zero, Equations (1) and (2) above can be rewritten as follows.

$$I_1 = I_{11} = V_1/R_1 \quad (5)$$

A similar derivation can be performed to express the electrical $I_2$ as follows.

$$I_2 = V_2/R_2 \quad (5)$$

From this, if $R_3$ equals zero, there will not be any current from the power supply 208a ($V_1$) passing through the field device 102b ($R_2$), and there will not be any current from the power supply 208b ($V_2$) passing through the field device 102a ($R_1$). As a result, there will not be any significant interference between the electrical currents $I_1$ and $I_2$ provided to the field devices 102a-102b (even though the electrical currents $I_1$ and $I_2$ pass through the same electrical conductor 114 at the same time). As long as the electrical conductor 114 has a very small resistance (approximately equal to zero), multiple field devices can be driven using multiple electrical currents without significant interference, as long as those electrical currents are generated by isolated power supplies.

Although FIG. 4 illustrates one example of an equivalent circuit 400 for a multi-device connection on an I/O terminal 205, various changes may be made to FIG. 4. For example, FIG. 4 shows two field devices 102a-102b coupled using a single electrical conductor 114 and two power supplies 208a-208b. However, there could be up to n electrical currents flowing on the electrical conductor 114 to n devices without significant interference, assuming there are n independent power supplies available (and the resistance of the electrical conductor 114 is suitably close to zero).

Figure 5:
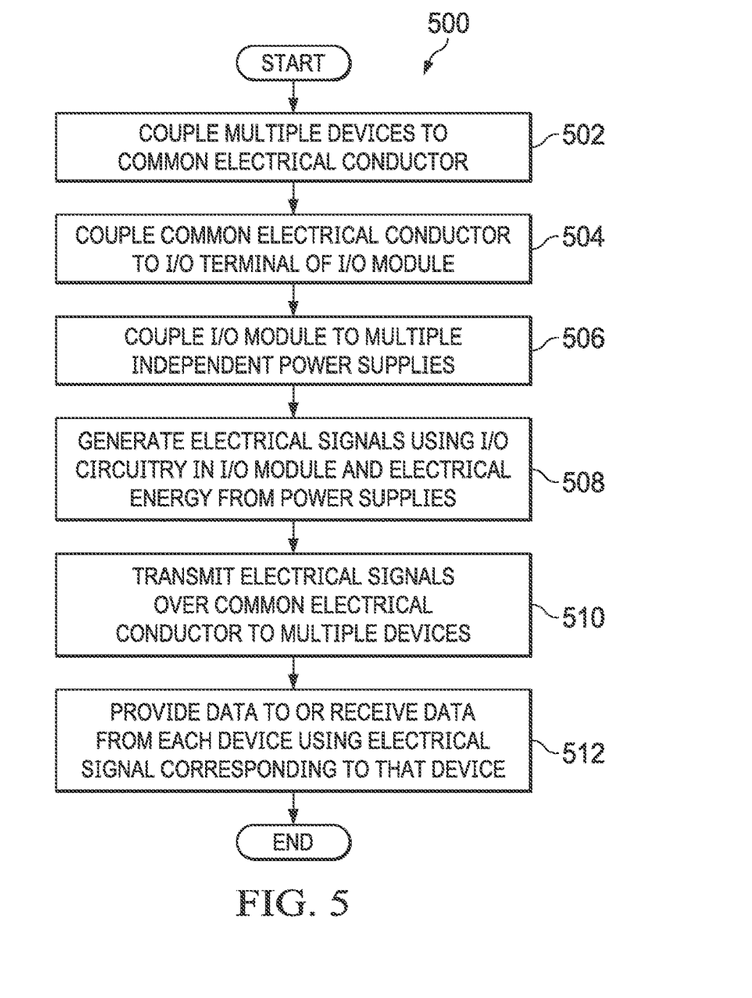
FIG. 5 illustrates an example method for using a multi-device connection on an I/O terminal according to this disclosure.

FIG. 5 illustrates an example method 500 for using a multi-device connection on an I/O terminal according to this disclosure. For ease of explanation, the method 500 is described as involving the use of the I/O module 104 shown in FIGS. 2 and 3 within the system 100 shown in FIG. 1. However, the method 500 could be used by any other suitable device and in any other suitable system, regardless of whether or not those devices or systems are used for industrial process control and automation.

As shown in FIG. 5, multiple devices are coupled to a common electrical conductor at step 502, and the common electrical conductor is coupled to an I/O terminal of an I/O module at step 504. This could include, for example, personnel coupling multiple field devices 102, 102a-102b to the same electrical conductor 114. This could also include personnel coupling the electrical conductor 114 to an I/O terminal 205 of an I/O module 104. The I/O module is coupled to multiple independent power supplies at step 506. This could include, for example, personnel coupling power terminals 204 of the I/O module 104 to electrical conductors 206 that are connected to multiple power supplies 208a-208b.

Multiple electrical signals are generated using I/O circuitry in the I/O module and using electrical energy from the power supplies at step 508. This could include, for example, the first I/O circuitry 302 and the second I/O circuitry 304 of the I/O module 104 generating electrical currents $I_1$ and $I_2$, respectively. This could also include the module controller 310 controlling the switches 306 and 308 to allow the respective electrical currents $I_1$ and $I_2$ to be generated and provided by the I/O module 104. The electrical signals are transmitted over the common electrical conductor to the multiple devices at step 510. This could include, for example, the I/O module 104 providing the electrical currents $I_1$ and $I_2$ over the electrical conductor 114 to the multiple field devices 102, 102a-102b. In this way, data can be provided to or received from each device using the electrical signal corresponding to that device at step 512. This could include, for example, the I/O module 104 receiving input data from a specified field device 102, 102a using an analog or digital signal. This could also include the I/O module 104 providing output data to a specified field device 102, 102b using an analog or digital signal. The communications with the multiple field devices 102, 102a-102b can occur simultaneously even though a common electrical conductor 114 is used to transport the electrical signals.

Although FIG. 5 illustrates one example of a method 500 for using a multi-device connection on an I/O terminal, various changes may be made to FIG. 5. For example, while shown as a series of steps, various steps in FIG. 5 can overlap, occur in parallel, occur in a different order, or occur any number of times.

FIGS. 6 through 9 illustrate example methods for supporting different types of I/O channels over a multi-device connection on an I/O terminal according to this disclosure. In particular, FIGS. 6 through 9 illustrate example methods for supporting specific combinations of I/O channels over a multi-device connection on an I/O terminal. For ease of explanation, the methods shown in FIGS. 6 through 9 are described as involving the use of the I/O module 104 shown in FIGS. 2 and 3 within the system 100 shown in FIG. 1. However, the methods shown in FIGS. 6 through 9 could be used by any other suitable device and in any other suitable system, regardless of whether or not those devices or systems are used for industrial process control and automation.

Figure 6:
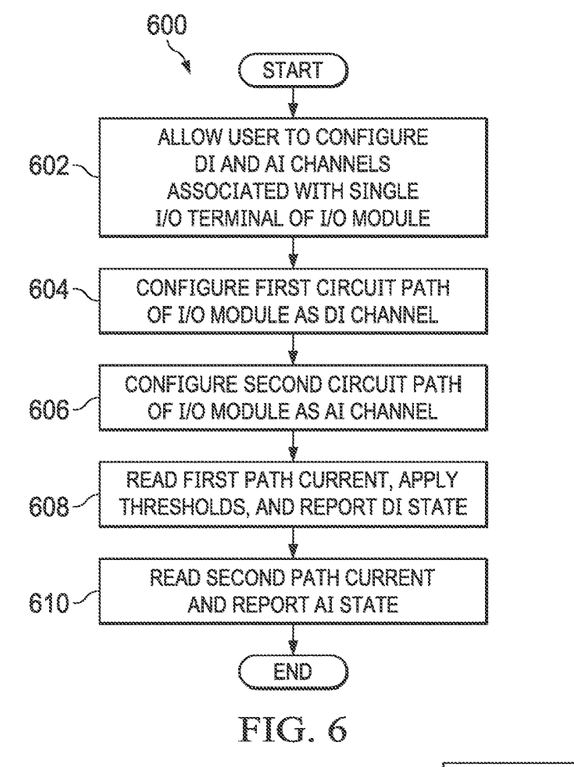
FIGS. 6 through 9 illustrate example methods for supporting different types of I/O channels over a multi-device connection on an I/O terminal according to this disclosure.

As shown in FIG. 6, a method 600 is provided for simultaneously supporting DI and AI I/O channels for multiple devices over a single electrical connection. A user is allowed to configure DI and AI channels associated with a single I/O terminal of an I/O module at step 602. This could include, for example, the I/O module 104 receiving information indicating that the user or other personnel have or are going to couple DI and AI field devices 102, 102a-

102b to the same electrical conductor 114 coupled to an I/O terminal 205 of an I/O module 104.

A first circuit path in the I/O module is configured to support a DI I/O channel at step 604, and a second circuit path in the I/O module is configured to support an AI I/O channel at step 606. This can include, for example, the I/O module 104 configuring the I/O circuitry 302 to support a DI channel and configuring the I/O circuitry 304 to support an AI channel (if universal or reconfigurable I/O channels are supported). Alternatively, this can include personnel installing I/O circuitry 302 to support a DI channel and installing I/O circuitry 304 to support an AI channel.

Once placed into operation, an electrical current through the first circuit path is measured, one or more thresholds are applied to the measurement, and a DI state is reported at step 608. This can include, for example, the electrical current sourced by the I/O circuitry 302 being measured by the module controller 310 using the associated sense resistor 312, amplifier 314, and ADC 316. This can also include the module controller 310 applying one or more thresholds to the current measurement to determine which digital state is being represented by the measured current. This can further include the module controller 310 communicating the digital state to at least one controller 106 or other destination(s) as a digital input value.

An electrical current through the second circuit path is measured and an AI state is reported at step 610. This can include, for example, the electrical current sourced by the I/O circuitry 304 being measured by the module controller 310 using the associated sense resistor 312, amplifier 314, and ADC 316. This can also include the module controller 310 communicating the current measurement to at least one controller 106 or other destination(s) as an analog input value.

Figure 7:
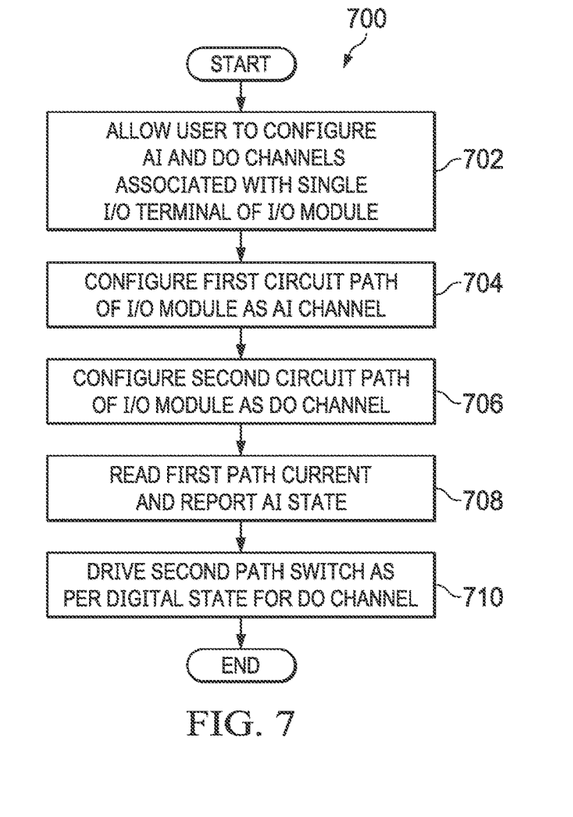

As shown in FIG. 7, a method 700 is provided for simultaneously supporting AI and DO I/O channels for multiple devices over a single electrical connection. A user is allowed to configure AI and DO channels associated with a single I/O terminal of an I/O module at step 702. This could include, for example, the I/O module 104 receiving information indicating that the user or other personnel have or are going to couple AI and DO field devices 102, 102a-102b to the same electrical conductor 114 coupled to an I/O terminal 205 of an I/O module 104.

A first circuit path in the I/O module is configured to support an AI I/O channel at step 704, and a second circuit path in the I/O module is configured to support a DO I/O channel at step 706. This can include, for example, the I/O module 104 configuring the I/O circuitry 302 to support an AI channel and configuring the I/O circuitry 304 to support a DO channel (if universal or reconfigurable I/O channels are supported). Alternatively, this can include personnel installing I/O circuitry 302 to support an AI channel and installing I/O circuitry 304 to support a DO channel.

Once placed into operation, an electrical current through the first circuit path is measured and an AI state is reported at step 708. This can include, for example, the electrical current sourced by the I/O circuitry 302 being measured by the module controller 310 using the associated sense resistor 312, amplifier 314, and ADC 316. This can also include the module controller 310 communicating the current measurement to at least one controller 106 or other destination(s) as an analog input value.

A switch in the second circuit path is driven as per a digital state for the DO channel at step 710. This can include, for example, the module controller 310 receiving a digital state to be output to a field device from a controller 106 or other source. This can also include the module controller 310 outputting a signal to the DAC 318 to activate or deactivate the switch 308 to achieve the desired digital state and communicate a digital output value.

Figure 8:
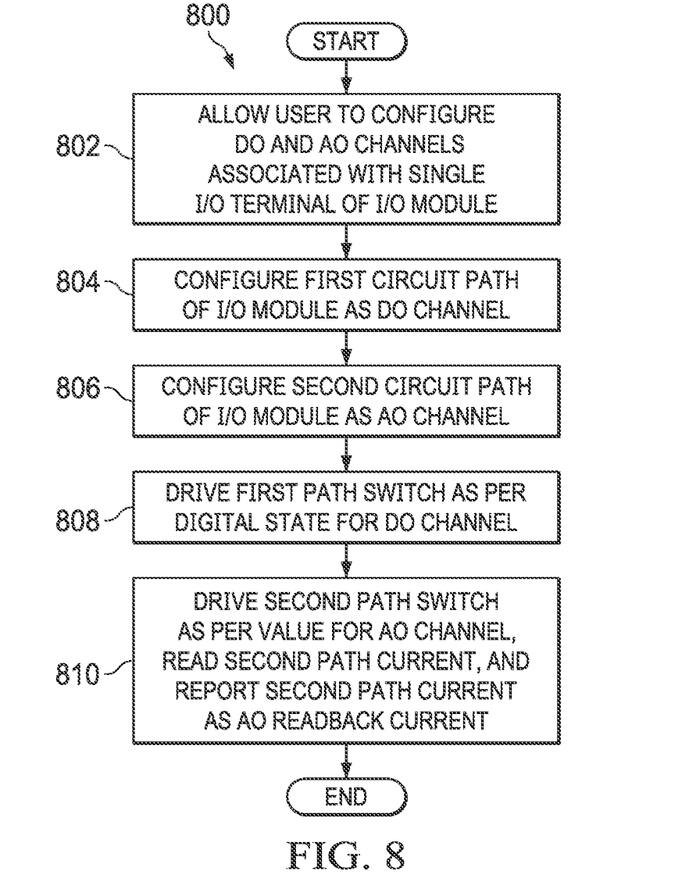

As shown in FIG. 8, a method 800 is provided for simultaneously supporting DO and AO I/O channels for multiple devices over a single electrical connection. A user is allowed to configure DO and AO channels associated with a single I/O terminal of an I/O module at step 802. This could include, for example, the I/O module 104 receiving information indicating that the user or other personnel have or are going to couple DO and AO field devices 102, 102a-102b to the same electrical conductor 114 coupled to an I/O terminal 205 of an I/O module 104.

A first circuit path in the I/O module is configured to support a DO I/O channel at step 804, and a second circuit path in the I/O module is configured to support an AO I/O channel at step 806. This can include, for example, the I/O module 104 configuring the I/O circuitry 302 to support a DO channel and configuring the I/O circuitry 304 to support an AO channel (if universal or reconfigurable I/O channels are supported). Alternatively, this can include personnel installing I/O circuitry 302 to support a DO channel and installing I/O circuitry 304 to support an AO channel.

Once placed into operation, a switch in the first circuit path is driven as per a digital state for the DO channel at step 808. This can include, for example, the module controller 310 receiving a digital state to be output to a field device from a controller 106 or other source. This can also include the module controller 310 outputting a signal to the DAC 318 to activate or deactivate the switch 308 to achieve the desired digital state and communicate a digital output value.

A current in the second circuit path is driven as per an analog value for the AO channel, a current in the second circuit path is read, and the read current is reported as a readback current at step 810. This can include, for example, the module controller 310 receiving an analog value to be output to a field device from a controller 106 or other source. This can also include the module controller 310 interacting with the I/O circuitry 304 to generate an electrical current representative of the analog value. This can further include the electrical current sourced by the I/O circuitry 304 being measured by the module controller 310 using the associated sense resistor 312, amplifier 314, and ADC 316 and communicated as a readback value to the controller 106 or other source of the analog value.

Figure 9:
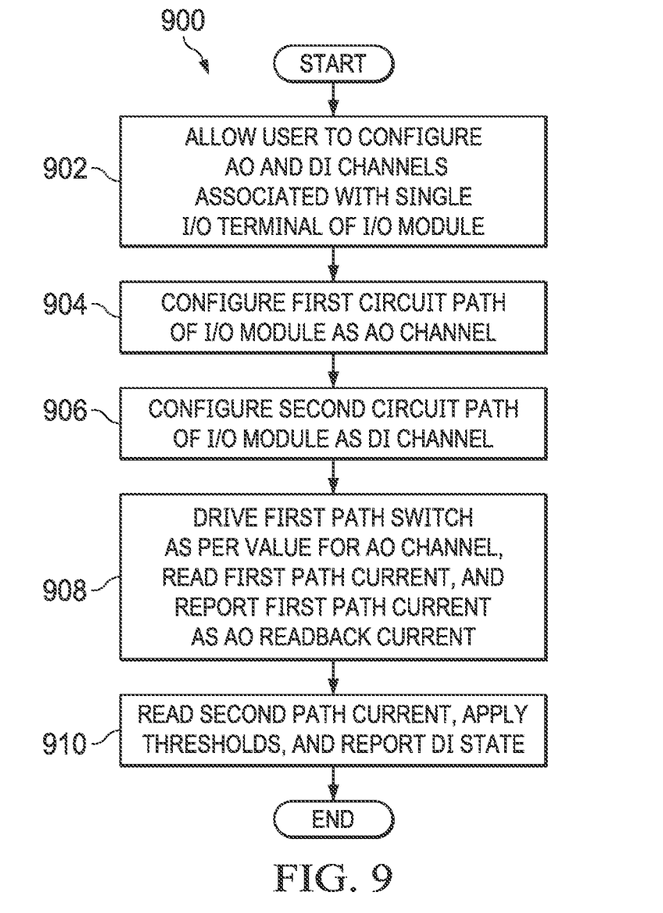

As shown in FIG. 9, a method 900 is provided for simultaneously supporting AO and DI I/O channels for multiple devices over a single electrical connection. A user is allowed to configure AO and DI channels associated with a single I/O terminal of an I/O module at step 902. This could include, for example, the I/O module 104 receiving information indicating that the user or other personnel have or are going to couple AO and DI field devices 102, 102a-102b to the same electrical conductor 114 coupled to an I/O terminal 205 of an I/O module 104.

A first circuit path in the I/O module is configured to support an AO I/O channel at step 904, and a second circuit path in the I/O module is configured to support a DI I/O channel at step 906. This can include, for example, the I/O module 104 configuring the I/O circuitry 302 to support an AO channel and configuring the I/O circuitry 304 to support a DI channel (if universal or reconfigurable I/O channels are supported). Alternatively, this can include personnel installing I/O circuitry 302 to support an AO channel and installing I/O circuitry 304 to support a DI channel.

Once placed into operation, a current in the first circuit path is driven as per an analog value for the AO channel, a current in the first circuit path is read, and the read current is reported as a readback current at step 908. This can include, for example, the module controller 310 receiving an analog value to be output to a field device from a controller 106 or other source. This can also include the module controller 310 interacting with the I/O circuitry 302 to generate an electrical current representative of the analog value. This can further include the electrical current sourced by the I/O circuitry 302 being measured by the module controller 310 using the associated sense resistor 312, amplifier 314, and ADC 316 and communicated as a readback value to the controller 106 or other source of the analog value.

An electrical current through the second circuit path is measured, one or more thresholds are applied to the measurement, and a DI state is reported at step 910. This can include, for example, the electrical current sourced by the I/O circuitry 304 being measured by the module controller 310 using the associated sense resistor 312, amplifier 314, and ADC 316. This can also include the module controller 310 applying one or more thresholds to the current measurement to determine which digital state is being represented by the measured current. This can further include the module controller 310 communicating the digital state to at least one controller 106 or other destination(s) as a digital input value.

Although FIGS. 6 through 9 illustrate examples of methods for supporting different types of I/O channels over a multi-device connection on an I/O terminal, various changes may be made to FIGS. 6 through 9. For example, while shown as a series of steps, various steps in each figure can overlap, occur in parallel, occur in a different order, or occur any number of times. Also, in these examples, the multi-device connection is shown as supporting one analog I/O channel (AI or AO) and one digital I/O channel (DI or DO). These techniques are therefore suitable for use with universal or reconfigurable I/O channels having analog and digital circuit components, such as those where only analog circuit components or only digital circuit components are used conventionally at any given time. However, the approaches described in this disclosure are not limited to use with one analog I/O channel and one digital I/O channel.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    generating multiple electrical signals to be used to communicate with multiple devices, wherein each of the multiple electrical signals is generated using electrical energy from a different one of multiple independent power supplies;
    transmitting the multiple electrical signals through an input/output (I/O) terminal coupled to a common electrical conductor, the common electrical conductor also coupled to the multiple devices;
    for each of the electrical signals, using the electrical signal to one of: receive input data from one of the multiple devices or provide output data to one of the multiple devices;
    for each electrical signal associated with an analog input channel, reading an electrical current and reporting a measured current as an analog input value;
    for each electrical signal associated with a digital input channel, reading an electrical current, applying one or more thresholds to the measured current, and reporting a digital state associated with the measured current as a digital input value;

for each electrical signal associated with an analog output channel, driving an electrical current based on an analog output value, reading the driven electrical current, and reporting the measured current as a readback value; and for each electrical signal associated with a digital output channel, driving a switch in the associated circuit path based on a digital output value.

2. The method of claim 1, further comprising:
coupling the multiple devices to the common electrical conductor; and
coupling the common electrical conductor to the I/O terminal.

3. The method of claim 1, wherein:
the I/O terminal forms part of an I/O module; and
the method further comprises coupling the power supplies to multiple power terminals of the I/O module.

4. The method of claim 1, wherein:
the I/O terminal forms part of an I/O module;
the I/O module comprises multiple I/O terminals; and
each of the I/O terminals is configured to be coupled to a different electrical conductor.

5. The method of claim 1, wherein:
generating the multiple electrical signals comprises generating each of the electrical signals using a different circuit path;
each of the circuit paths comprises a switch; and
the method further comprises controlling the switches in the circuit paths to control the generation of the electrical signals.

6. The method of claim 1, wherein the multiple electrical signals comprise a first electrical current used for analog I/O and a second electrical current used for digital I/O.

7. An apparatus comprising:
multiple circuit paths configured to generate multiple electrical signals to be used to communicate with multiple devices, wherein each of the circuit paths is configured to use electrical energy from a different one of multiple independent power supplies; and
an input/output (I/O) terminal configured to be coupled to a common electrical conductor that is coupled to the multiple devices, the I/O terminal configured to pass the electrical signals to the common electrical conductor, wherein the apparatus is configured to use each of the electrical signals to one of: receive input data from one of the multiple devices or provide output data to one of the multiple devices; and
a controller configured to:
for each electrical signal associated with an analog input channel, read an electrical current and report a measured current as an analog input value;
for each electrical signal associated with a digital input channel, read an electrical current, apply one or more thresholds to the measured current, and report a digital state associated with the measured current as a digital input value;
for each electrical signal associated with an analog output channel, drive an electrical current based on an analog output value, read the driven electrical current, and report the measured current as a readback value; and
for each electrical signal associated with a digital output channel, drive a switch in the associated circuit path based on a digital output value.

8. The apparatus of claim 7, wherein the multiple circuit paths are configured to support at least one of:
the analog input channel and the digital input channel;
the analog input channel and the digital output channel;
the analog output channel and the digital input channel; and
the analog output channel and the digital output channel.

9. The apparatus of claim 8, wherein the apparatus further comprises power terminals configured to be coupled to the power supplies.

10. The apparatus of claim 7, wherein:
the apparatus comprises an I/O module;
the I/O module comprises multiple I/O terminals; and
each of the I/O terminals is configured to be coupled to a different electrical conductor.

11. The apparatus of claim 7, wherein the apparatus comprises at least sixteen I/O terminals.

12. The apparatus of claim 7, wherein:
each of the circuit paths comprises a switch; and
the apparatus further comprises a controller configured to control the switches in the circuit paths to control the generation of the electrical signals.

13. The apparatus of claim 7, wherein the multiple electrical signals comprise a first electrical current used for analog I/O and a second electrical current used for digital I/O.

14. A system comprising:
an input/output (I/O) module comprising an I/O terminal;
multiple field devices; and
an electrical conductor coupled to the I/O terminal and the field devices;
wherein:
the I/O module further comprises multiple circuit paths configured to generate multiple electrical signals to be used to communicate with the multiple devices, wherein each of the circuit paths is configured to use electrical energy from a different one of multiple independent power supplies;
the I/O terminal is configured to pass the electrical signals to the electrical conductor; and
the I/O module is configured to use each of the electrical signals to one of:
receive input data from one of the multiple devices or provide output data to one of the multiple devices;
wherein the I/O module further comprises a controller configured to:
for each electrical signal associated with an analog input channel, read an electrical current and report a measured current as an analog input value;
for each electrical signal associated with a digital input channel, read an electrical current, apply one or more thresholds to the measured current, and report a digital state associated with the measured current as a digital input value;
for each electrical signal associated with an analog output channel, drive an electrical current based on an analog output value, read the driven electrical current, and report the measured current as a readback value; and
for each electrical signal associated with a digital output channel, drive a switch in the associated circuit path based on a digital output value.

15. The system of claim 14, wherein the multiple circuit paths are configured to support at least one of:
the analog input channel and the digital input channel;
the analog input channel and the digital output channel;
the analog output channel and the digital input channel; and
the analog output channel and the digital output channel.

16. The system of claim 14, wherein:
the I/O module comprises multiple I/O terminals; and
each of the I/O terminals is configured to be coupled to a different electrical conductor.

17. The system of claim 14, wherein:
each of the circuit paths comprises a switch; and
the I/O module further comprises a controller configured to control the switches in the circuit paths to control the generation of the electrical signals.

\* \* \* \* \*